(12) United States Patent
Rezbarik et al.

(10) Patent No.: US 8,851,562 B2
(45) Date of Patent: Oct. 7, 2014

(54) HEAD RESTRAINT FOR A VEHICLE SEAT

(75) Inventors: Miroslav Rezbarik, Trencin (SK);
Michal Martinka, Nove Mesto n.V. (SK); Ivan Jakubec, Trnava (SK)

(73) Assignee: Johnson Controls Technology Company, Holland, MI (US)

( * ) Notice: Subject to any disclaimer, the term of this patent is extended or adjusted under 35 U.S.C. 154(b) by 58 days.

(21) Appl. No.: 13/820,486

(22) PCT Filed: Sep. 9, 2011

(86) PCT No.: PCT/EP2011/065636
§ 371 (c)(1),
(2), (4) Date: Apr. 25, 2013

(87) PCT Pub. No.: WO2012/032152
PCT Pub. Date: Mar. 15, 2012

(65) Prior Publication Data
US 2013/0207439 A1    Aug. 15, 2013

(30) Foreign Application Priority Data
Sep. 11, 2010    (DE) .......................... 10 2010 045 128

(51) Int. Cl.
*B60N 2/48*    (2006.01)

(52) U.S. Cl.
CPC ............ *B60N 2/4855* (2013.01); *B60N 2/4832* (2013.01); *B60N 2/487* (2013.01); *B60N 2002/4891* (2013.01); *B60N 2/4808* (2013.01)
USPC ................... 297/61; 297/378.12; 297/378.14; 297/408; 297/410

(58) Field of Classification Search
USPC ................. 297/61, 331, 335, 378.12, 378.13, 297/378.14, 408, 410
See application file for complete search history.

(56) References Cited

U.S. PATENT DOCUMENTS 6,779,839 B2 *    8/2004    Andreasson et al. ............ 297/61
7,008,019 B2 *    3/2006    Lampke et al. ................ 297/408
(Continued)

FOREIGN PATENT DOCUMENTS

DE    102004034158 A1    8/2005
DE    102010003664 A1    10/2010
(Continued)

OTHER PUBLICATIONS

International Search Report for application No. PCT/EP2011/065636 mailed Dec. 20, 2012.

(Continued)

*Primary Examiner* — Rodney B White
(74) *Attorney, Agent, or Firm* — Fletcher Yoder, P.C.

(57) ABSTRACT

A vehicle head restraint on a seat back is adjustable in height from a non-usage position to a usage position. The head restraint is disposed on a retaining element formed from a U-shaped tubular section and of which a horizontally disposed section forms the axis of rotation of the head restraint. The head restraint and retaining element are coupled by means of a spring element such that a biasing force of the spring element is applied to the head rest, wherein sections of the spring element engage in respective cutouts disposed on both sides in the region of rounded portions of the retaining element, and the biasing force generated rotates a lower end of the head rest automatically in the direction of the retaining element as the head rest is moved from the non-usage position to the usage position.

14 Claims, 5 Drawing Sheets

(56) References Cited

U.S. PATENT DOCUMENTS

Figure 1:
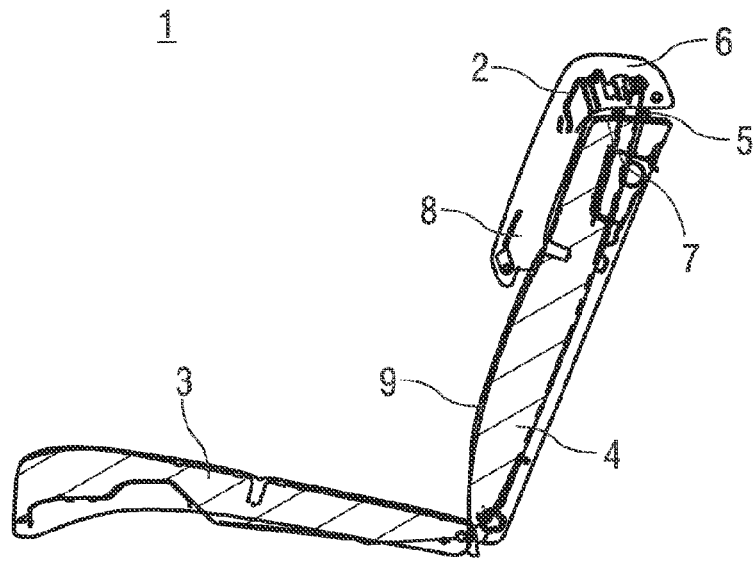

| | | | |
|---|---|---|---|
| 7,059,681 B2 * | 6/2006 | Kubo | 297/410 |
| 7,325,877 B2 * | 2/2008 | Brockman et al. | 297/408 |
| 7,552,973 B2 * | 6/2009 | Linardi et al. | 297/408 |
| 8,104,836 B2 * | 1/2012 | Little | 297/408 |
| 8,182,037 B2 * | 5/2012 | Jeong et al. | 297/61 X |
| 8,322,790 B2 * | 12/2012 | Tscherbner | 297/408 |
| 8,388,069 B2 * | 3/2013 | Kajimoto | 297/408 |
| 8,690,253 B2 * | 4/2014 | Tscherbner | 297/408 |
| 2005/0067874 A1 * | 3/2005 | Kamrath et al. | 297/408 |
| 2005/0168038 A1 | 8/2005 | Kubo | |
| 2008/0036263 A1 | 2/2008 | Little | |
| 2010/0259087 A1 | 10/2010 | Tscherbner | |
| 2012/0062010 A1 * | 3/2012 | Holmes et al. | 297/408 X |

FOREIGN PATENT DOCUMENTS

| | | |
|---|---|---|
| JP | 2006306251 A | 11/2006 |
| JP | 2007082616 A | 4/2007 |

OTHER PUBLICATIONS

1st Office Action issued for DE102010045128.2 Apr. 6, 2011, 3 pgs.

\* cited by examiner

HEAD RESTRAINT FOR A VEHICLE SEAT

CROSS REFERENCE TO RELATED APPLICATIONS

This application claims priority from and the benefit of PCT Application No. PCT/EP2011/065636, filed on Sep. 9, 2011; and German Patent DE 10 2010 045 128.2, filed on Sep. 11, 2010; both entitled "Head Restraint for a Vehicle Seat", which are herein incorporated by reference.

BACKGROUND

The invention relates to a head restraint for a vehicle seat according to the features of the preamble of claim 1.

In the prior art, DE 10 2004 034 158 A1 describes a head restraint for a seat, in particular motor vehicle seat, which is arranged on a seat back and has means enabling the head restraint to be lowered from a use position into a non-use position. In the non-use position, a free view for an occupant to the rear is made possible; in this case, the head restraint can be shifted into the non-use position to a lowered position in front of the seat back where it forms an annoying contour.

US 2005 0168 038 A1 describes a head restraint for a vehicle seat, the head restraint having an inverted L shape.

JP 2007 082 616 A describes a vehicle seat with a head restraint arrangement and an associated height adjustment.

DE 10 2010 003 664 A1 describes a seat arrangement with a seat back, a supporting column which extends from the seat back, and a headrest which is arranged pivotably on the supporting column. The headrest has a lower headrest section, an upper headrest section which extends from the lower headrest section, and a hinge clip which connects the headrest pivotably to the supporting column. The headrest is prevented from pivoting in a first direction of rotation about an axis of rotation when the lower headrest section is in engagement with the supporting column.

SUMMARY

It is the object of the present invention to provide an improved, in particular more easily operable and more comfortable head restraint for a vehicle seat.

Preferred refinements and developments of the invention are indicated in the dependent claims.

The object is achieved by a head restraint for a vehicle seat, wherein the head restraint is arranged on a seat back of the vehicle seat so as to be height adjustable in such a manner that it can be adjusted from a non-use position into a use position. According to the invention, the head restraint is arranged in an inclination-adjustable manner on a holding element which is formed from a U-shaped tubular section, the horizontally arranged section of which forms the axis of rotation of the head restraint, wherein the head restraint and the holding element are coupled by a spring element in such a manner that the head restraint is acted upon by a pretensioning force of the spring element. The pretensioning force rotates a lower end of the head restraint automatically in the direction of the holding element as the head restraint is transferred from the non-use position into the use position. As a result, in the use position, a front side of the head restraint is advantageously oriented perpendicularly or virtually perpendicularly. Contact of the lower end of the head restraint with the seated person's body is therefore reliably avoided and the seating comfort is improved.

Particularly advantageously, all legal requirements are met with the head restraint according to the invention.

According to the invention, the holding element is formed from a U-shaped tubular section, the horizontally arranged section of which forms the axis of rotation of the head restraint. A plurality of functions can therefore be integrated in one component in a simple manner. The horizontally arranged section of the head restraint forms the axis of rotation and the vertical sections form the height adjustment of the head restraint.

According to the invention, in the holding element, recesses are arranged on both sides in the region of rounded portions which form the transition between the horizontally arranged section and the vertical sections. The spring ends of the spring element can be arranged in said recesses advantageously without a tool.

The spring element is in the form of a double torsion spring. Such a torsion spring is a helical spring which is subject to torsional stress about the axis thereof. A spring leg is expediently arranged centrally between two torsion spring sections of the spring element and is coupled to the two torsion spring sections.

A spring end is preferably arranged on the outer side of each of the torsion spring sections, wherein the spring ends are formed in a corresponding manner to the recesses in the holding element.

According to a preferred embodiment of the invention, a head restraint frame is arranged pivotably on the holding element by means of a clip, wherein the clip loops with the closed section thereof around the holding element and is fastened to the head restraint frame with a screw. An inclination adjustment of the head restraint is therefore made possible in a simple manner with a small number of components and with the holding element as the axis of rotation.

A covering element is preferably arranged on the rear side of the head restraint frame, wherein a holding lug is formed in an upper region of the covering element, and a pin and two latching lugs are formed in a lower region of the covering element.

Particularly advantageously, the covering element can be fitted on the head restraint frame by means of the holding lug, the pin and the latching lugs without a tool.

The head restraint preferably has an L-shaped cross section, wherein the holding element is coupled pivotably to the head restraint at the upper end thereof.

In the non-use position, a lower region of the head restraint advantageously protrudes significantly beyond a front edge of the seat back, thus forming an interfering structure for the seat occupant causing the latter to transfer the head restraint into the use position. In the use position, the lower edge of the head restraint is arranged above an upper edge of the seat back such that a vehicle occupant is protected by means of the head restraint and the adjustment thereof against injury.

DRAWINGS

Figure 2:
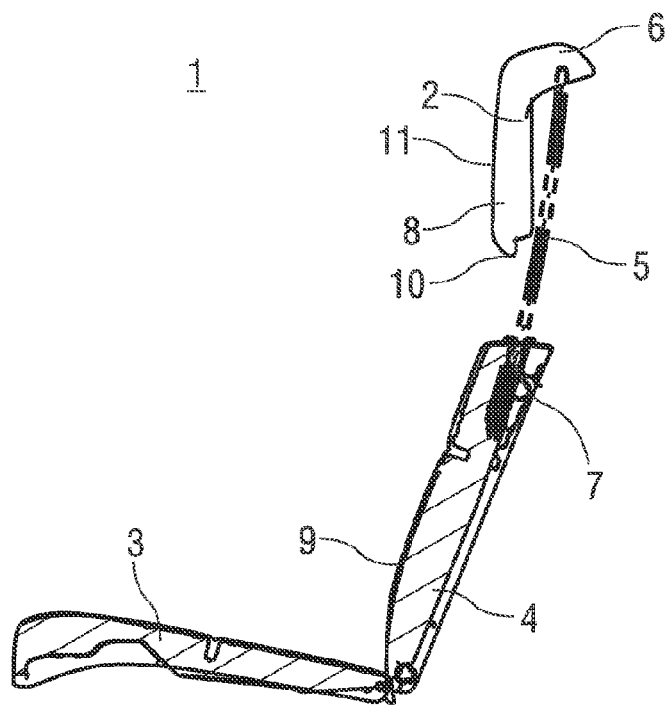
Figure 3:
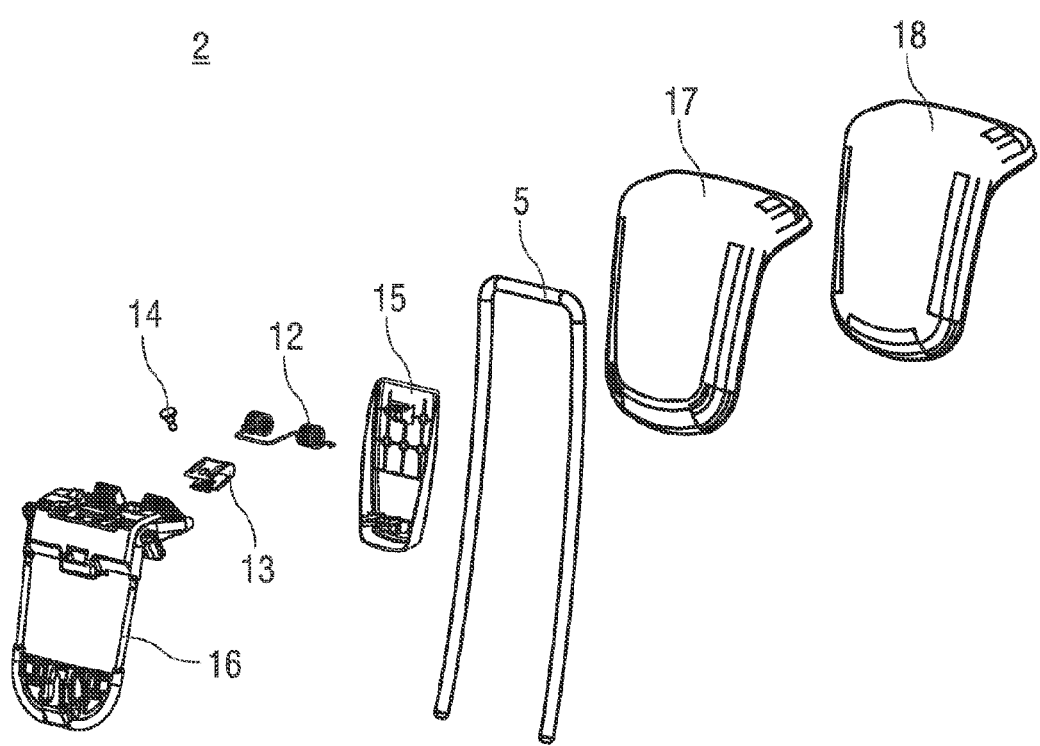
Figure 4:
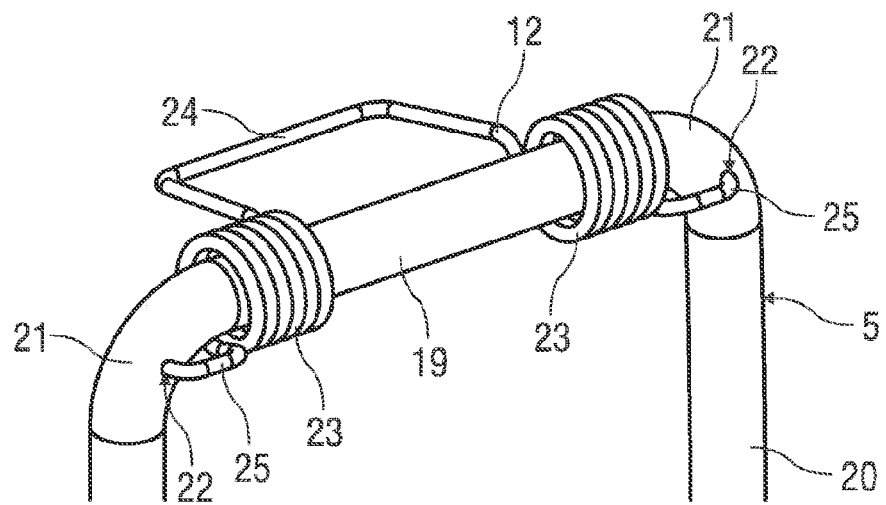
Figure 5:
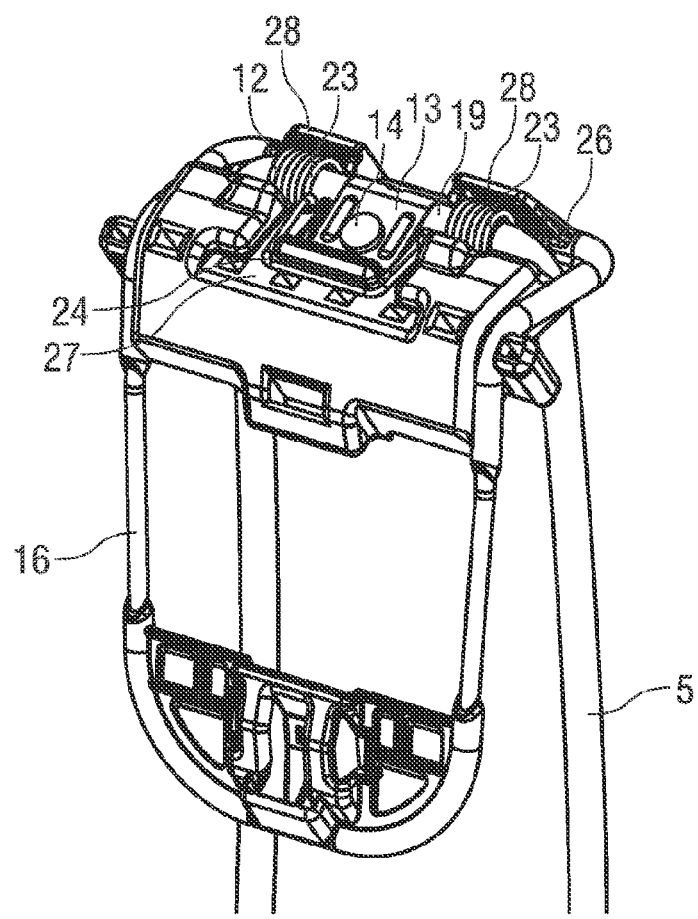
Figure 6:
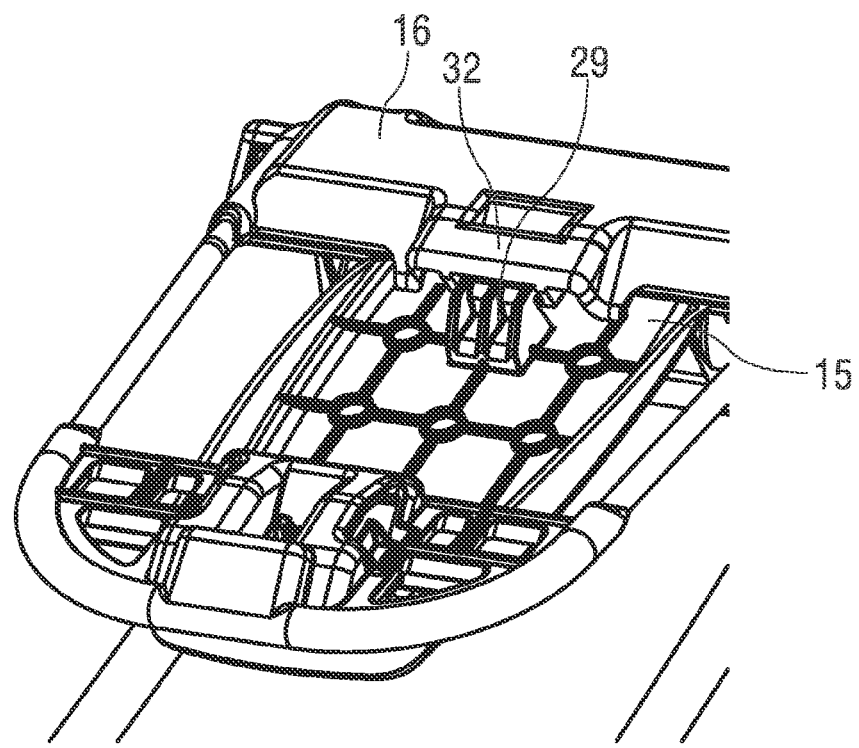
Figure 7:
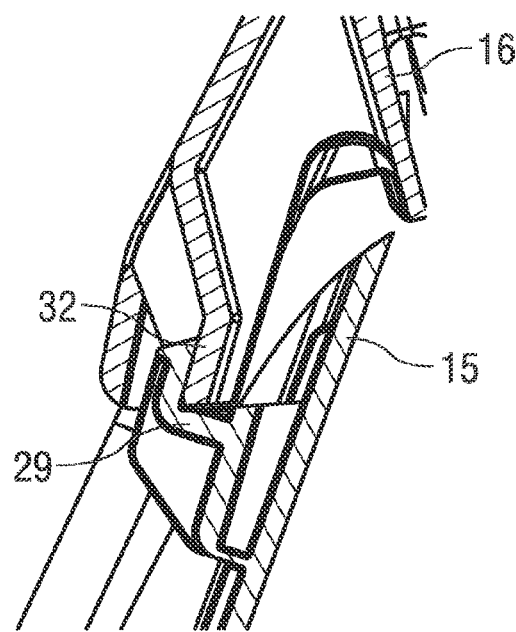
Figure 8:
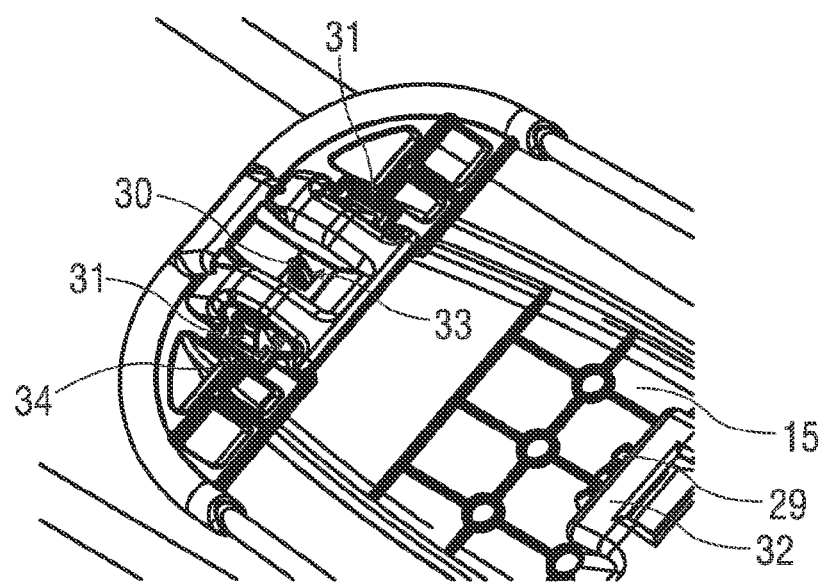
Figure 9:
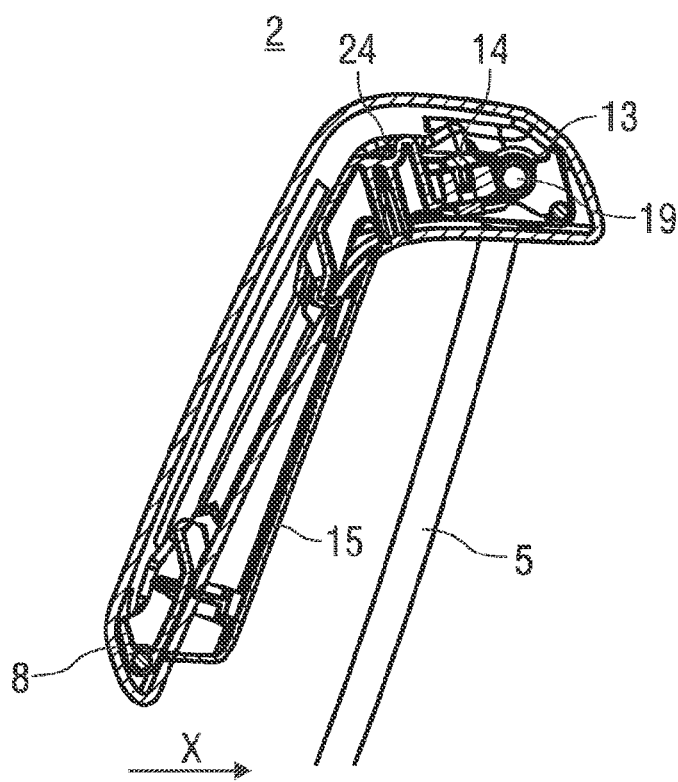

Exemplary embodiments of the invention are explained in more detail below with reference to drawings, in which:

FIG. 1 shows schematically a side view of a vehicle seat with a head restraint in the non-use position, FIG. 2 shows schematically a side view of a vehicle seat with a head restraint in the use position, FIG. 3 shows schematically an exploded illustration of the individual parts of the head restraint, FIG. 4 shows schematically the holding element with the spring element fitted thereon, FIG. 5 shows schematically the holding element with the head restraint frame fitted thereon, FIG. 6 shows schematically the head restraint frame with the covering element fitted thereon, FIG. 7 shows schematically a detailed view of the holding lug of the covering element, FIG. 8 shows schematically a detailed view of the latching lugs and of the pin of the covering element, and FIG. 9 shows schematically a side view of the head restraint.

DETAILED DESCRIPTION

Mutually corresponding parts are provided with the same reference numbers in all of the drawings.

FIG. 1 schematically illustrates a side view of a vehicle seat 1 with a head restraint 2 in the non-use position.

Such a vehicle seat 1 comprises at least one seat surface 3 and a seat back 4. The head restraint 2 is arranged at the upper end of the seat back 4. In the non-use position, the head restraint 2 is arranged in the lowermost position, i.e. a holding element 5 which permits a height adjustment of the head restraint 2 is virtually completely pushed into the seat back 4. Said non-use position of the head restraint 2 makes it possible to expand a visual range of the driver when the vehicle seat 1 is not occupied.

Viewed in a side view, the head restraint 2 is L-shaped in design, wherein the holding element 5 is coupled pivotably to the head restraint 2 at the upper end 6 thereof. In the non-use position, the upper end 6 of the head restraint 2 is arranged bearing against an upper edge 7 of the seat back 4. Resulting therefrom, the lower region 8 of the head restraint 2 is arranged bearing against a front edge 9 of the seat back 4.

The head restraint 2 is formed in such a manner that, in the non-use position, the lower region 8 of the head restraint 2 protrudes significantly beyond the front edge 9 of the seat back 4. This results in a very uncomfortable seating position for as long as the head restraint 2 is arranged in the non-use position. For comfortable use of the vehicle seat 1, the head restraint 2 therefore has to be adjusted from the non-use position into the use position.

FIG. 2 schematically illustrates a side view of the vehicle seat 1 with the head restraint 2 in the use position.

In the use position, the head restraint 2 is pulled by the holding element 5 out of the seat back 4 in such a manner that a lower edge 10 of the head restraint 2 is arranged above the upper edge 7 of the seat back 4. According to the invention, in the use position, the lower region 8 of the head restraint 2 automatically rotates in the direction of the holding element 5 until, preferably, the lower region 8 of the head restraint 2 bears against the holding element 5.

A front side 11 of the head restraint 2, which front side is oriented parallel to the front edge 9 of the seat back 4 in the non-use position, is oriented perpendicularly or virtually perpendicularly in the use position.

FIG. 3 schematically illustrates an exploded illustration of the individual parts of the head restraint 2.

The head restraint 2 at least comprises the holding element 5, a spring element 12, a clip 13, a screw 14, a covering element 15, a head restraint frame 16, a cushion 17 and a cushion cover 18.

FIG. 4 schematically illustrates the holding element 5 with the spring element 12 fitted thereon.

The holding element 5 is preferably formed from a U-shaped tubular section having a round cross section, the horizontally arranged section 19 of which forms the axis of rotation of the head restraint 2 while the vertical sections 20 permit the height adjustment of the head restraint 2. In the holding element 5, a round recess 22 which extends at a right angle to the axis of rotation of the head restraint 2 is arranged in each case on both sides in the region of the rounded portions 21.

The spring element 12 is in the form of a double torsion spring which, as a helical spring, is subject to torsional stress about the axis thereof.

A spring leg 24 is arranged centrally between the two torsion spring sections 23 of the spring element 12 and is coupled to the two torsion spring sections 23. A spring end 25 is arranged on the outer side of each of the torsion spring sections 23, wherein the spring ends 25 are formed in a corresponding manner to the recesses 22 and engage in the latter.

During the assembly of the head restraint 2, the spring ends 25 of the spring element 12 can be arranged in the round recesses 22 of the holding element 5 without a tool.

FIG. 5 schematically illustrates the holding element 5 with the head restraint frame 16 fitted thereon.

The head restraint frame 16 has a section 26 which is in the form of a groove, is formed in a corresponding manner to the horizontal section 19 of the holding element 5 and in which the horizontal section 19 of the holding element 5 is arranged during the operation of the head restraint 2.

A surface 27 on which the spring leg 24 is arranged during the operation of the head restraint 2 is formed in the region of the upper side of the head restraint frame 16. Resulting therefrom, the torsional force of the pretensioned spring element 12 acts on the surface 27, the head restraint frame 16 and the entire head restraint 2.

A U-shaped clip 13 is arranged in the region of the spring leg 24, thus between the two torsion spring sections 23 of the spring element 12.

The head restraint frame 16 is arranged pivotably on the holding element 5 by means of said clip 13, wherein the clip 13 loops with the closed section thereof around the holding element 5 and is fastened to the head restraint frame 16 with the screw 14.

In the region of the torsion spring sections 23 of the spring element 12, protective coverings 28 are integrally formed on the head restraint frame 16, said protective coverings preventing contact and resultant wear of the cushion 17 of the head restraint 2 with the torsion spring sections 23.

FIG. 6 schematically illustrates the head restraint frame 16 with the covering element 15 fitted thereon.

The covering element 15 at least comprises an upper holding lug 29 and a lower pin 30 and also two latching lugs 31.

FIG. 7 schematically illustrates a detailed view of the upper holding lug 29 of the covering element 15.

This holding lug 29 is in the form of a hook and is arranged on a correspondingly formed section 32 of the head restraint frame 16.

FIG. 8 schematically illustrates a detailed view of the latching lugs 31 and of the pin 30 of the covering element 15.

The pin 30 is arranged centrally in the lower region of the covering element 15 and is formed in a corresponding manner to a guide opening 33 in the head restraint frame 16.

The latching lugs 31 are arranged on both sides of the pin 30 and engage in corresponding formations 34 in the head restraint frame 16.

The covering element 15 serves to cover a rear side of the head restraint 2. By means of a different thickness of the covering element 15, it is possible to influence how far the lower region 8 of the head restraint 2 protrudes beyond the front edge 9 of the seat back 4 in the non-use position and the thickness of the annoying contour resulting therefrom.

If, for example, the covering element 15 is formed in a flat manner, only a flat annoying contour can be formed. If the covering element 15 is formed with great thickness, a thick and very uncomfortable annoying contour can be formed.

FIG. 9 schematically illustrates a side view of the head restraint 2.

The horizontally arranged section 19 of the holding element 5 is arranged in the section 26 which is in the form of a groove in the head restraint frame 16 and is fastened pivotably by means of the clip 13. The pretensioning force of the spring element 12 acts on the upper side and in particular on the surface 27 of the head restraint frame 16 by means of the spring leg 24. The pretensioning force of the spring element 12 brings about a rotation of the head restraint 2 about the horizontally arranged section 19 of the holding element 5 in the form of an axis of rotation. As a result, the lower region 8 of the head restraint 2 is rotated in the direction X of the holding element 5 until the lower region 8 of the head restraint 2 bears against the holding element 5.

The invention claimed is:

1. A head restraint for a vehicle seat, wherein the head restraint is arranged on a seat back of the vehicle seat so as to be height-adjustable in such a manner that it can be adjusted from a non-use position into a use position, wherein the head restraint is arranged in an inclination-adjustable manner on a holding element which is formed from a U-shaped tubular section, a horizontally arranged section of the U-shaped tubular section forming an axis of rotation of the head restraint, wherein the head restraint and the holding element are coupled by a spring element in such a manner that the head restraint is acted upon by a pretensioning force of the spring element, and wherein sections of the spring element engage in respective recesses arranged on both sides in regions of rounded portions of the holding element, and the pretensioning force produced in such a manner automatically rotates a lower edge of the head restraint in the direction of the holding element as the head restraint is transferred from the non-use position into the use position.

2. The head restraint as claimed in claim 1, wherein the spring element is in the form of a double torsion spring.

3. The head restraint as claimed in claim 1, wherein a spring leg is arranged centrally between two torsion spring sections of the spring element and is coupled to the two torsion spring sections.

4. The head restraint as claimed in claim 3, wherein a spring end is arranged on an outer side of each of the torsion spring sections, and wherein the spring ends are formed in a corresponding manner to recesses in the holding element.

5. The head restraint as claimed in claim 3, wherein the spring ends of the spring element can be arranged in round recesses of the holding element without a tool.

6. The head restraint as claimed in claim 1, wherein a head restraint frame is arranged pivotably on the holding element by a clip, wherein the clip loops with a closed section thereof around the holding element and is fastened to the head restraint frame with a screw.

7. The head restraint as claimed in claim 6, wherein a covering element is arranged on a rear side of the head restraint frame.

8. The head restraint as claimed in claim 7, wherein a holding lug is formed in an upper region of the covering element.

9. The head restraint as claimed in claim 7, wherein a pin and two latching lugs are formed in a lower region of the covering element.

10. The head restraint as claimed in claim 9, wherein the covering element can be fitted on the head restraint frame by the holding lug, the pin and the latching lugs without a tool.

11. The head restraint as claimed in claim 1, wherein the head restraint has an L-shaped cross section.

12. The head restraint as claimed in claim 1, wherein the holding element is coupled pivotably to the head restraint at an upper end thereof.

13. The head restraint as claimed in claim 1, wherein in the non-use position, a lower region of the head restraint protrudes significantly beyond a front edge of the seat back.

14. The head restraint as claimed in claim 1, wherein in the use position, the lower edge of the head restraint is arranged above an upper edge of the seat back.

* * * * *